United States Patent [19]
Kornylak

[11] 3,924,718
[45] Dec. 9, 1975

[54] ADJUSTABLE SUPPORT

[75] Inventor: Andrew T. Kornylak, Hamilton, Ohio

[73] Assignee: Kornylak Corporation, Hamilton, Ohio

[22] Filed: June 3, 1974

[21] Appl. No.: 475,936

[52] U.S. Cl.............. 193/35 R; 198/126; 198/233; 248/188.2; 248/408
[51] Int. Cl.² ................... B65G 13/12; B65G 41/00
[58] Field of Search ......... 193/35, 1, 42; 248/188.2, 248/188.5, 125, 161, 157, 407, 408, 409, 248/423, 354 R; 403/107, 353; 108/144, 108/146; 198/117, 126, 233

[56] References Cited
UNITED STATES PATENTS

| 916,413 | 3/1909 | Biedermann......................... 248/409 |
| 2,376,716 | 5/1945 | Odin ............................... 248/407 X |
| 2,586,724 | 2/1952 | Sannebeck........................ 108/146 X |
| 2,594,295 | 4/1952 | Cushmann ......................... 193/35 R |
| 3,179,071 | 4/1965 | Johnston........................... 248/407 X |
| 3,379,401 | 4/1968 | Pellegrino............................ 248/407 |

OTHER PUBLICATIONS
"Gravity Roller Conveyors," Conveyor Specialty Co., Inc., Publication, May 25, 1953.

Primary Examiner—Evon C. Blunk
Assistant Examiner—James L. Rowland
Attorney, Agent, or Firm—Thomas E. Beall, Jr.

[57] ABSTRACT

An inclined roller gravity conveyor having an adjustable foot or support for one end of the beam that carries a plurality of rollers thereon, which adjustable support has a bracket that hooks over the top of the conveyor beam and is clamped at its lower end by a set screw extending through a bracket body that hooks around the lower end of the beam for carrying a rod within the aperture in the bracket body so that teeth on one side of the rod will selectively engage with a springed detent within the body in one rotation position of the rod for supporting the conveyor end and will be out of engagement with the detent in another rotated position of the rod for selected vertical movement between the rod and beam for height adjustment and corresponding inclination adjustment of the roller conveyor.

11 Claims, 2 Drawing Figures

ADJUSTABLE SUPPORT

BACKGROUND OF THE INVENTION

There are many different inclined gravity roller conveyors, which usually have one or more beams or rails carrying a plurality of freely rotatable rollers thereon supporting the load and moving the load in the direction of the beam by gravity. With the same inclination of the conveyor, different types of loads will travel at different speeds, so that it is many times desirable to adjust the inclination of the conveyor to produce a particular desired speed for different types of loads, and correspondingly for the same type of load it is desirable to adjust the conveyor inclination to obtain different speeds of conveying. These adjustments may be performed by lifting or lowering the end of the conveyor beams to change their inclination respectively with the support surface. But all means of accomplishing such inclination adjustment have been unsatisfactory with respect to conveyors to require frequent adjustments, due to the difficulty of adjustment involved.

SUMMARY OF INVENTION

It is an object of the present invention to provide a height or inclination adjustment support for the beam or rail of a gravity conveyor which is easy to operate, simple in construction, and may be left on the conveyor during storage without taking up a great deal of room.

BRIEF DESCRIPTION OF THE DRAWING

Further objects, features and advantages of the present invention will become more clear from the following detailed description of a preferred embodiment of the invention, as shown in the attached drawing, wherein.

DETAILED DESCRIPTION OF THE PREFERRED EMBODIMENT

Figure 1:
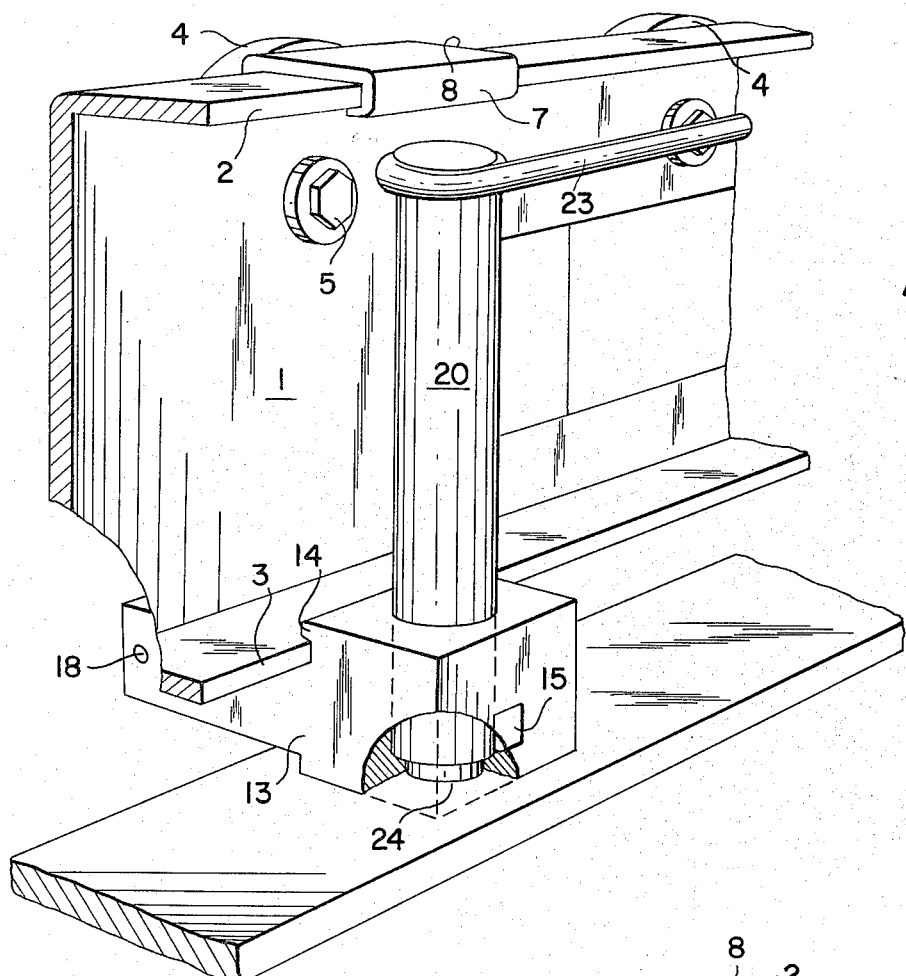
FIG. 1 is a perspective view, with portions broken away in section, of a preferred embodied of the present invention.

As shown in FIG. 1, the present invention may be provided with a conventional type of conveyor, that is provided with a generally U-shaped beam or rail having a webbed portion 1, upper horizontal leg 2, and lower horizontal leg 3. This beam carries a plurality of rollers 4 that have their upper surfaces above the beam for supporting or conveying loads thereon, which rollers are freely rotatably mounted on the beam by means of bearing bolts 5, which have not been shown in detail, because they may be of any conventional construction well known in the art.

The above mentioned conventional conveyor beam, or any other type of conveyor beam may be supported at one end, by the adjustable support of the present invention for readily changing its inclination. The other end of the beam, not shown, may be supported in any desired manner.

The adjustable support of the present invention includes a bracket having the flange 6 that extends underneath leg 2 of the conveyor beam, and the upper U-shaped portion extends around the upper portion of leg 2 and includes a downwardly extending leg 7, a web portion 8 and an opposite leg portion, which extends to form an intermediate portion 9 extending along the web 1 of the beam down to an outwardly turned flange 10 that is opposite to the leg 3 of the beam. The flange 10 is received within a corresponding recess within a bracket body that has a set screw 11 extending through its upper portion 12 to clamp the bracket 6–10 against the beam. The bracket body has a main portion 13 rigidly connecting the upper portion 12 and an inturned flange 14 that, as shown, hooks over and tightly clamps the leg 3 of the beam. The flange 14 has a lower wedge surface so as to securely clamp the bracket body 13 to the beam with tightening of the set screw 11.

The bracket body 13 has a horizontally extending detent aperture 15, which extends completely through the bracket 13 and slidably carries therein a detent pin 16. A spring 17 engages, at one end, the detent pin 16 and engages at its other end an abutment cross pin 18 that extends through the bracket body 13 into the aperture 15. The bracket body has a further aperture 19 that extends vertically completely through the bracket body 13 and intersects the detent aperture 15. A rod 20 is carried within the aperture 19, and both the aperture 19 and rod 20 are preferably circular so that the rod 20 may freely rotate therein. The rod 20 is provided with a pluraiity of rack teeth 21 on one side, and the detent pin 16 at its end opposite of the spring 17 is provided with a detent tooth 22 that is shaped to fit between the teeth 21 of the rod 20. Preferably, the detent pin 16 and its aperture 15 are noncircular so that the detent pin 16 will not rotate within its aperture. The upper end of the rod 20 is provided with a handle 23 to assist in manually rotating the rod 20 about its vertical longitudinal axis. The handle 23 is preferably constructed of a rod that has one end bent to encircle and rigidly engage the rod 20, purely by friction or with welding, and has its other end extending transversely from the rod 20, in the general horizontal direction, so that when the teeth 21 are in engagement with the detent tooth 22, the handle 23 will entend generally parallel to and closely adjacent to the beam web portion 1.

In the illustrated position, it is seen that a load on rollers 4 will be transferred to the beam by means of the roller bearings 5, the load will be transferred from the beam to the rigidly attached bracket body 13, which will in turn transfer the load to the detent pin 16, the teeth 22, 21, the rod 20, and the support surface beneath the rod 20, which is engaged by the lower terminal end of 24 of the rod 20. The lower end 24 of the rod 20 may be constructed of a hard bearing metal tip inserted within an appropriate aperture of the rod 20 as shown by dotted lines, or it may be merely an extension of rod 20.

Figure 2:
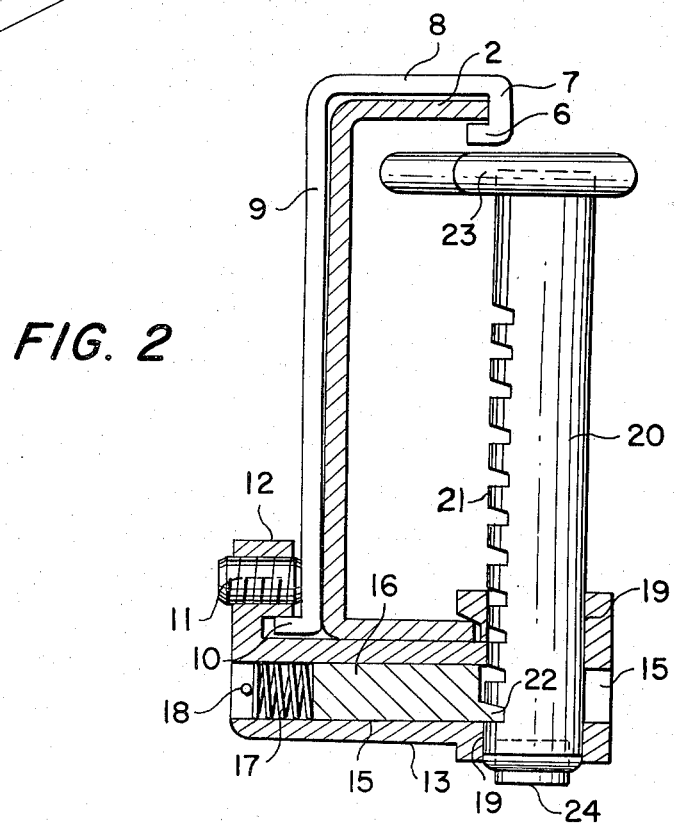
FIG. 2 is a cross-section view of the device of FIG. 1.

When it is desired to change the inclination of the gravity conveyor beam, the handle 23 is manually turned clockwise in FIG. 1 90° so as to extend perpendicular to the beam. Correspondingly the rod 20 will rotate 90° to disengage the teeth 21 from the detent tooth 22 and cam the detent 16 to the left as shown in FIG. 2 against the bias of the spring 17 to a position where the detent tooth 22 will engage a smooth longitudinal uninterrupted surface of the rod 20 without teeth, so that the rod 20 may be moved vertically relatively to the bracket body 13 to correspondingly adjust the vertical spacing between the beam and the support surface that is engaged by the lower end 24 of the rod 20. Once the new desired spacing, corresponding to the desired inclination, is obtained, the handle 23 is again used to rotate the rod 20 back to its illustrated position where the spring 17 will bias the detent tooth 22 into engagement with the adjacent teeth of the rack 21 in the newly adjusted position.

It is contemplated different types of brackets and different dimensions for the brackets may be used correspondingly to different types of beams, and that the various sized bracket bodies may be employed with a common handle, rod construction. Further, the adjustable unit may be readily attached to a beam and remain with the beam even during the storage of the conveyor, because very little room is taken up by the adjustment device and the cost of the adjustment device is very small. The set screw may be operated with a conventional screw driver, or Allen wrench. Once the adjustable device is securely clamped to the beam, no tools are needed for adjustment of the conveyor inclination.

While a preferred embodiment of the present invention has been shown in considerable detail for purposes of illustration and the advantages of the details, further embodiments, modifications, and variations are contemplated according to the broader aspects of the present invention, all as determined by the spirit and scope of the following claims.

What is claimed is:

1. An inclined conveyor, comprising: at least one beam extending generally in the conveying direction; a plurality of load supporting rollers mounted for free rotation about generally horizontal axis on said beam, in spaced relationship in the conveying direction; a support surface below said beam; and means for adjustably supporting one end of said beam on said support surface with adjustable height to correspondingly adjust the conveyor inclination including a generally vertically extending rod having its lower end engaging said support surface, handle means for rotating said rod about its longitudinal axis, said handle means being a bar having one end secured to the upper end of said rod and the other end extending transversely from said rod so as to extend generally parallel with said beam in said one engaged position and transversely of said beam in said disengaged position, a plurality of rack teeth on only one side of said rod and being generally uniformly vertically spaced along said one side of said rod, a bracket body having a generally vertical through aperture receiving therein said rod, means for releasably attaching said bracket body rigidly to said beam, and detent means within said bracket body for engaging at least an adjacent one of said rack teeth in one position of said rod and being completely out of engagement with said rack teeth in another rotated position of said rod to prevent relative movement between said rod and bracket body in the engaged one position and to allow free vertical relative movement between said rod and said bracket body in said disengaged another position.

2. The apparatus of claim 1, wherein said detent means includes a detent aperture in said bracket body generally perpendicular to and opening into said bracket body aperture, a detent pin slidably contained within said detent aperture, and spring means for urging said detent pin into engagement with said rod.

3. The apparatus of claim 2, wherein said means for attaching said bracket body to said beam includes a separate member engaging said beam and set screw means within said bracket body clamping said separate member between said bracket body and said beam.

4. The apparatus of claim 3, wherein said separate member is a sheet metal bracket having a U-shaped portion with a web overlying said beam, one leg on the side of said beam adjacent said rod and an opposite leg extending vertically along the side of said beam opposite from said rod, and a flange portion at the bottom of said intermediate portion extending away from said beam in the horizontal direction; and said bracket body including a recess receiving therein said flange.

5. The apparatus of claim 4, wherein said beam in a generally U-shaped channel member having horizontally extending upper and lower legs and a vertically extending web; said bracket body including a flange extending over the top of the lower one of said legs at its terminal end, an intermediate support surface engaging the lower surface of said lower leg; said recess being a continuation of said intermediate support surface and said set screw means being immediately above said recess; said separate member U-shaped portion including a flange extending around and underneath the terminal end of said upper beam leg.

6. The apparatus of claim 1, wherein said means for attaching said bracket body to said beam includes a separate member engaging said beam and set screw means within said bracket body clamping said separate member between said bracket body and said beam.

7. The apparatus of claim 1, wherein said handle means bar has said one end bent circumferentially around and secured to the upper end of said rod.

8. An adjustable support for selectively varying the spacing between a member to be supported and a support surface, comprising: an elongated rod having one end for engaging said support surface; handle means for rotating said rod about its longitudinal axis; said handle means being an elongated bar having one end bent circumferentially around and secured to the upper end of said rod and the other end extending transversely from said rod; a plurality of rack teeth on only one side of said rod and being generally uniformly longitudinally spaced along said one side of said rod; a bracket body having a through aperture longitudinally receiving therein said rod; means for releasably attaching said bracket body rigidly to the member to be supported; and detent means within said bracket body for engaging at least an adjacent one of said rack teeth in one position of said rod and being completely out of engagement with said rack teeth in another rotated position of said rod to prevent relative movement between said rod and bracket body in the engaged one position and to allow free longitudinal relative movement between said rod and said bracket body in said disengaged another position.

9. The apparatus of claim 8, wherein said detent means includes a detent aperture in said bracket body generally perpendicular to and opening into said bracket body aperture, a detent pin slidably contained within said detent aperture, and spring means for urging said detent pin into engagement with said rod.

10. The apparatus of claim 8, wherein said means for attaching said bracket body to said member includes a separate member for engaging said member to be supported and set screw means within said bracket body; said separate member being a sheet metal bracket having a U-shaped portion with a web and opposed legs, and a flange portion at the bottom of one leg extending in the horizontal direction perpendicular to said one leg and away from the opposite leg; said bracket body including a recess parallel with said set screw receiving therein said flange; said bracket body including a flange opposite said recess and an intermediate support surface between said body flange and recess; said recess being a continuation of said intermediate support surface and said set screw means being immediately above said recess.

11. The apparatus of claim 8, wherein said means for attaching said bracket body includes a separate member for engaging said member to be supported and set screw means within said bracket body clamping said separate member between said bracket body and said beam.

\* \* \* \* \*